July 9, 1940.  F. W. KIRBY ET AL  2,207,258
CORN SHELLER
Filed Jan. 11, 1937  2 Sheets-Sheet 1
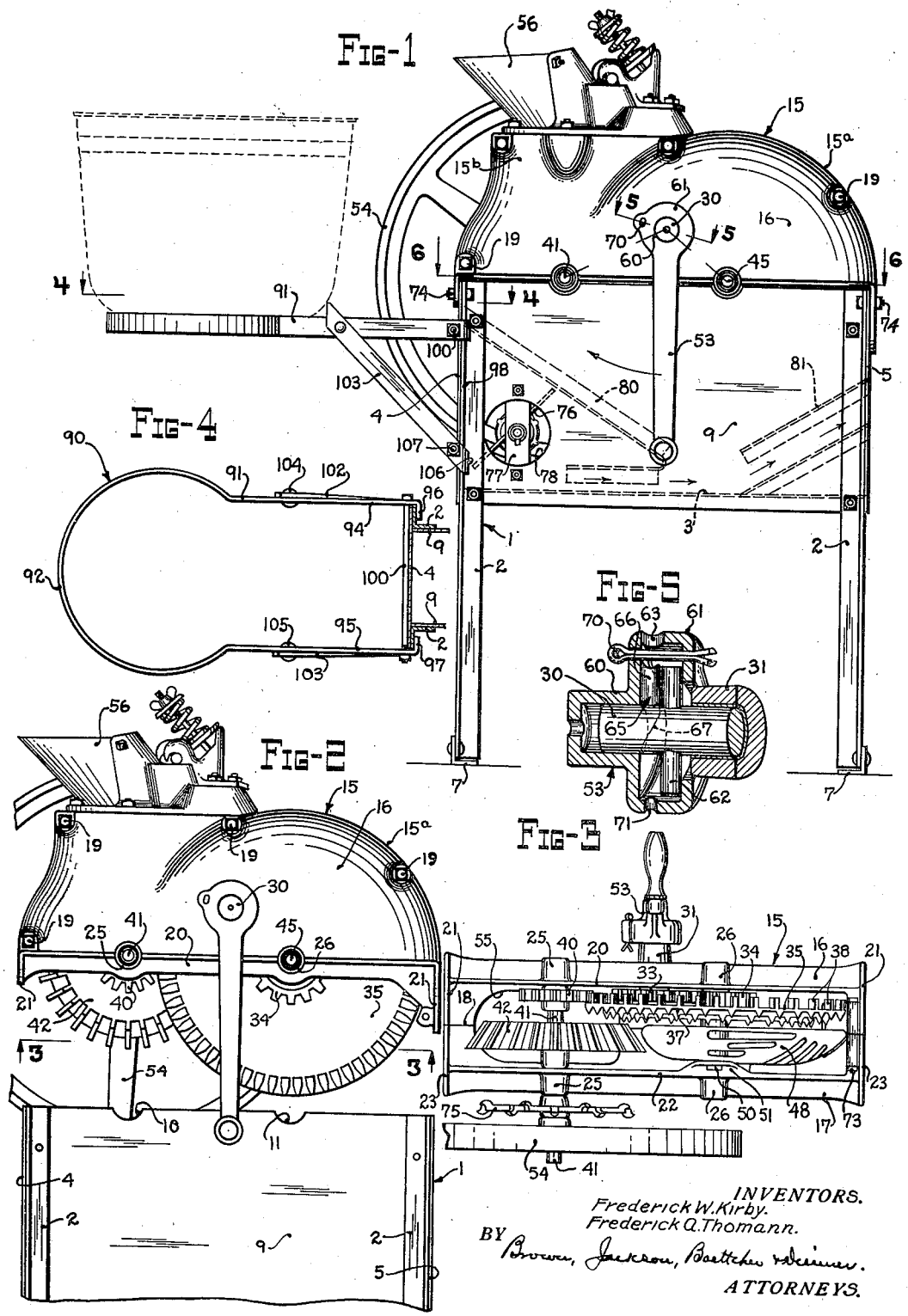
INVENTORS.
Frederick W. Kirby.
Frederick Q. Thomann.
BY
ATTORNEYS.

July 9, 1940.    F. W. KIRBY ET AL    2,207,258
CORN SHELLER
Filed Jan. 11, 1937    2 Sheets-Sheet 2
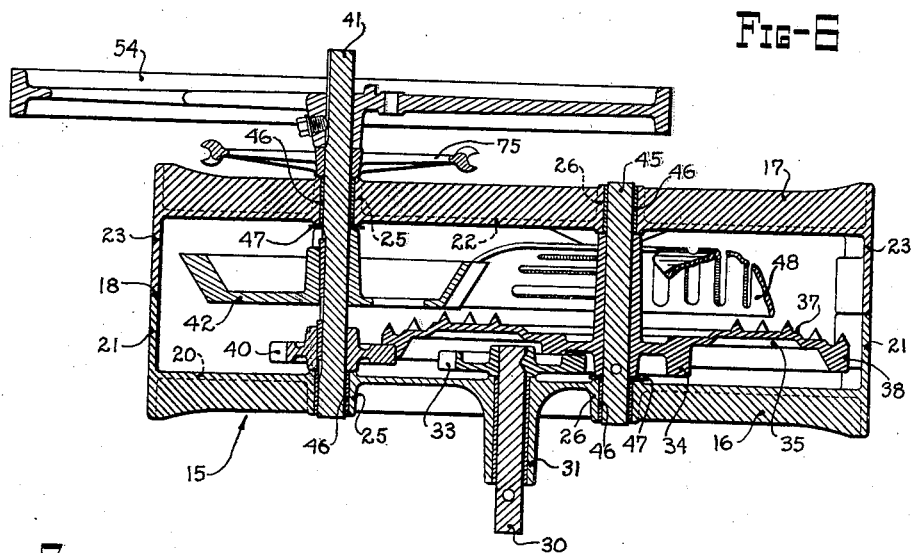
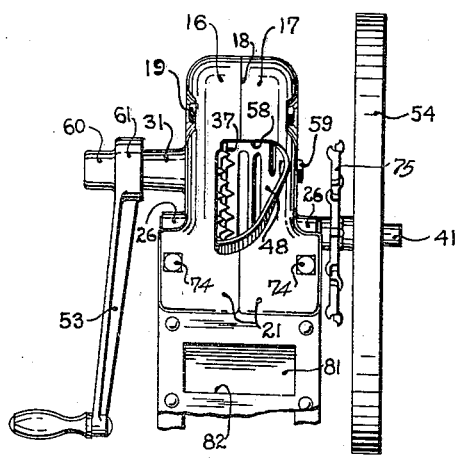
INVENTORS
Frederick W. Kirby
Frederick Q. Thomann
BY
ATTORNEYS Patented July 9, 1940

2,207,258

UNITED STATES PATENT OFFICE 2,207,258

CORN SHELLER

Frederick W. Kirby, Moline, and Frederick A. Thomann, East Moline, Ill., assignors to Deere & Company, Moline, Ill., a corporation of Illinois Application January 11, 1937, Serial No. 119,944

10 Claims. (Cl. 130—7)

The present invention relates generally to corn shelling machines, and is more particularly concerned with hand shellers adapted for manual operation.

The principal object of the present invention is the provision of a hand sheller of sturdy construction, in which there is little likelihood of any of the operating parts and their bearings becoming misaligned.

Hand corn shellers usually embody a straight runner that moves the ear of corn into proper position with respect to the bevel runner which removes the kernels of corn from the cob, and an adjustable rag iron or similar part that retards the ear of corn sufficiently so that all of the corn is shelled from the cob. The straight and bevel runners are usually mounted on separate shafts which, in turn, are supported by bearings. Heretofore, the bearings for the shelling mechanism shafts have been mounted separately on the sheller frame, dependence being placed upon the latter for maintaining the shafts in their proper positions and for also maintaining the straight and bevel runners in their proper relative positions. Due to the fact that the straight runner, the rag iron, and the bevel runner form a generally triangular throat to receive the ear of corn being shelled, it will be seen that it is important to maintain the axial position of the straight runner relative to the bevel runner in order that the latter can be relied upon to shell the corn efficiently and quickly. Also, when the shafts and bearings are not in alignment, the shelling mechanism does not run true and heavy draft occurs.

The principal object of the present invention is the provision of an easy running long lived hand sheller embodying a rigid cast metal head that is formed and constructed to rigidly and permanently support the shaft and crank bearings and associated parts in proper alignment at all times. Especially is it an object of the present invention to support the bearings entirely independently of the sheller frame. Thus, should it happen that any of the frame parts become loosened or otherwise disposed out of the proper position, such can have no effect upon the bearing support for the movable parts of the shelling mechanism.

Another important object of the present invention is to form the cast metal head, carrying practically all of the shelling mechanism parts independently of the sheller frame, of two accurately mating cast metal sections, which are accurately machined in a jig that bores and faces all bearings and bolt holes at one time, and to connect these sections rigidly and permanently together so as to maintain accuracy of alignment and position of the several journal bearings carried by the rigid head.

Another object of the present invention in this connection is the formation of the aforesaid journal bearings integrally with said head.

Another object of the present invention is the provision of a new and improved basket rack adapted to be clamped in any convenient adjusted position onto the sheller frame, and a further object of the present invention is the provision of a new and improved ratchet mechanism to connect the hand crank with the drive shaft of the shelling mechanism so as to prevent the flywheel of the shelling mechanism from driving the crank.

These and other objects and advantages of the present invention will be apparent to those skilled in the art after a consideration of the following description, taken in conjunction with the accompanying drawings illustrating the preferred structural embodiment of our invention.

In the drawings:

Figure 1 is a side view of a hand sheller embodying the principles of the present invention;

Figure 2 is a view similar to Figure 1, but illustrating the manner in which the shelling mechanism is supported practically entirely by the rigid cast metal head, independently of the frame of the sheller;

Figure 3 is a view looking upwardly substantially along the line 3—3 of Figure 2;

Figure 4 is a view looking downwardly on the basket rack, taken substantially along the line 4—4 of Figure 1;

Figure 5 is a cross-sectional view taken through the ratchet mechanism for the hand crank, substantially along the line 5—5 of Figure 1;

Figure 6 is a section taken along the line 6—6 of Figure 1; and

Figure 7 is an end view showing the discharge openings for the cobs and chaff.

Referring now to the drawings, more particularly Figures 1, 2 and 3, the frame of the sheller is indicated in its entirety by the reference numeral 1, and includes a plurality of vertically disposed angles 2 suitably fastened together by horizontal side angles 3 and end plates 4 and 5. The vertical angle members at each end of the sheller are connected to angle iron feet 7 to provide a substantial base for the sheller. The side portions of the upper part of the frame are enclosed by side panels 9, preferably of sheet metal, and these side panels are notched as at 10 and 11 (Figure 2) for a purpose which will appear later.

The head of the sheller, containing most of the shelling mechanism, is indicated in its entirety by the reference numeral 15 and comprises two cast metal mating sections 16 and 17 (Figure 3), each having an accurately machined contacting face or edge 18 and suitable registering openings in which a plurality of bolts 19 are placed. These bolts, in passing through the aforesaid registering openings, serve as dowel pins, and in the manufacture of the head sections 16 and 17 all bearings and bolt holes in each section are drilled and faced at one time, insuring their accuracy of position, so that when the bolts 19 are tightened, the two head parts 16 and 17 are rigidly and permanently fastened together so that the rigidity of the sheller head 15 as a whole is not dependent upon the rigidity of the frame 1, as in previous practice. The lower edge of the cast metal head section 16 is provided with an inner flange 20 and downwardly disposed end lugs 21. Similarly, the other head section 17 includes a downwardly disposed flange 22 and end lugs 23. Also, each of the rigid head sections 16 and 17 is provided with a pair of downwardly disposed bearing receiving sections or journal boxes 25 and 26, the bearing sections 25 and 26 at one side of the head 15 being rigidly held in alignment with the corresponding bearing sections 25 and 26 at the other side when the bolts 19 are tightened to fasten the two head sections 16 and 17 rigidly and permanently together. The shelling mechanism is preferably of conventional construction, and embodies a drive shaft 30 journaled for rotation in an extended sleeve 31 formed on the head section 16 (Figure 3), and the inner end of the drive shaft 30 carries a drive gear 33 that meshes with a pinion 34 that is preferably formed integrally with a straight runner 35. The latter is provided with a toothed ear engaging face 37 and a series of gear teeth 38 meshing with a pinion 40 that is fixed to the shaft 41 from which a bevel runner 42 is carried. As best shown in Figures 2 and 6, the shaft 41 is supported for rotation in the journal boxes 25 formed integrally with the sections 16 and 17 of the head casting 15, and the pinion 34 and straight runner 35 are fixed to a shaft 45 that is mounted for rotation in the journal boxes 26 of the head casting 15.

Each of the shafts 41 and 45 are supported for rotation in their respective journal boxes so as to maintain the proper relative positions, both laterally and axially, between the straight and bevel runners and associated parts. As best shown in Figure 6, cylindrical bronze bearing bushings 46 are pressed into the bearing openings formed in the casting sections 16 and 17 and are then reamed to bring them to the desired internal diameter to receive the shafts 41 and 45. The reamer in this operation tends to expand the bearing bushings, causing them to seat tightly in the bearing openings in the casting sections 16 and 17. The axial thrust on the shafts 41 and 45, arising during the shelling operation, is taken care of by a washer 47 on each shaft between the adjacent end of the hub of the runner on the shaft and the bearing box in the casting section.

It is important to note that since the head casting 15 is a rigid part, the bearing supports for the two shafts 41 and 45 are maintained in accurate alignment, both laterally and axially, during the life of the machine, and for this reason a corn sheller constructed according to the principles of the present invention retains its efficiency and clean shelling qualities, irrespective of any distortion, looseness, or misalignment of the frame. The shelling mechanism also includes a cob guard 48 of well known conventional construction which is secured, as by a bolt 50, to a downwardly extending lug 51 formed on the head section 17 adjacent the journal box 26, as best shown in Figure 3. The drive shaft 30 of the shelling mechanism is preferably actuated by a hand crank 53 which is connected by suitable ratchet mechanism, to be described later, permitting the shelling mechanism to overrun the crank so that danger of injury to the operator from a revolving crank driven by the shelling mechanism after letting go of the handle is eliminated.

From Figures 1 and 2, it will be noted that the portion of the rigid mechanism supporting head 15 receiving the upper part of the straight runner 35 is of generally semi-circular formation and is indicated by the reference numeral 15a, and that the other portion of the head 15, receiving the bevel runner 42 is extended upwardly, as at 15b, and is provided with an opening 55 therein (Figure 3) over which the feed spout 56 is bolted. Usually, a feed table (not shown) is mounted on the head 15 so as to direct the ears of corn to be shelled to the feed spout 56 into the shelling mechanism. The portion of the supported head 15 opposite the spout 56 is provided with an opening 58 through which the cobs are directed during the shelling operation by the cob guard 48. Preferably, the upper portion of the cob guard 48 is supported in the opening 58 by means, such as a bolt 59, fastening the cob guard to the head section 17. The cob opening 58 is formed by having notches in adjacent sections of the head parts 16 and 17, as best shown in Figure 7.

The ratchet or one-way clutch mechanism connecting the hand crank 53 to the drive shaft 30 is best shown in Figure 5. The hand crank carries a hub 60 which engages over the outer end of the drive shaft 30, and includes a radially outwardly extended section 61. The outer end of the shaft 30 is provided with a hole to receive a pin 62, and the hub section 61 is provided with an opening 63 which is large enough to receive the pin 62 and to permit its being inserted into the hole in the shaft 30 after the handle 53 has been placed over the shaft 30. The hub 60 of the crank handle 53 includes a projecting section 65 which at one end terminates in a shoulder 66 that is curved about a radially disposed axis, corresponding approximately to the form of the pin 62. The axial thickness of the projection 65 on the crank hub decreases from the shoulder 66 around to the opposite side of the hub, forming a cam surface 67, so that the crank handle can be engaged with the pin 62 to drive the shaft 30 by turning the handle in the direction of the arrow shown in Figure 1 and, at the same time, pushing the handle inwardly so as to cause the shoulder 66 to engage one end of the pin 62, whereupon continued rotation of the handle 53 will drive the sheller. However, by virtue of the adjacent camming surface 67, if rotation of the handle 53 ceases, the continued operation of the shelling mechanism under the momentum of the flywheel 54 merely causes one end of the pin to ride up on the camming surface 67 and will be prevented from driving the handle 53. However, the handle can be used to drive the shelling mechanism by rotating it in the proper direction and, at the same time, forcing the same inwardly so as to again engage the shoulder 66 with one end of the pin 62. The enlarged hub section 61 is provided with a pair of openings adjacent the pin receiving opening 63 to accommodate a cotter key 70 which is inserted so as to prevent the pin 62 from falling out through the opening 63. However, by removing the cotter key 70, the pin 62 can be removed, as by forcing it outwardly through the opening 63 with a tool or punch inserted through an opening 71 in the enlarged hub section diametrically opposite the opening 63.

The shaft 41 carrying the flywheel 54 has a fan pulley 75 (Figures 3, 6 and 7) suitably fixed thereto in any suitable manner, and the pulley 75 receives a belt (not shown) by which the pulley 75 drives a fan 76 that is supported in bearings carried by a pair of straps 77 (Figure 1) suitably fixed to the side panels 9 over intake openings 78 formed therein. The fan 76 directs a blast of air along the lower portion of a corn chute member 80, the other member 81 of which is inclined upwardly (Figure 1) and leads to a chaff discharge opening 82.

During the manufacture of the corn sheller as described above, after the shelling mechanism parts have been positioned in the rigid head casting 15 and the casting parts rigidly bolted together in permanent fashion by the bolts 19 and by the bolts 73 (Figures 2 and 3) at the ends of the casting sections 16 and 17, the head and shelling mechanism as a unit is lowered onto the upper end of the frame 1 in substantially the relation shown in Figure 2. The notches 10 and 11 in the opposite side panels 9 are provided to accommodate the downwardly extending sections 25 and 26. After the head 15 is disposed in the proper position, each of the end lugs 21 and 23 is fastened in position by a bolt 74 (Figure 1).

The operation of the corn sheller described above is substantially as follows. The ears of corn are fed through the feed spout 56 and pass downwardly into the space between the rag iron and the straight and bevel runners 35 and 42. The rotation of the crank drives the straight runner 35 at a certain speed, and the bevel runner 42 is driven at an increased speed and serves to remove the grains of corn from the cob. After the corn has been shelled, the cobs are forced outwardly through the cob opening 58, while the shelled corn falls downwardly between the corn chute sections 80 and 81 through the bottom of the machine and into a suitable container underneath, and chaff and the like are discharged out through the opening 82. By virtue of the above described ratchet mechanism, the operator can momentarily stop turning the crank 53, but the continued operation of the shelling mechanism will not cause the crank to be driven, so that there is no danger of the operator being injured by the shelling mechanism carrying the crank around during the periods that the shelling mechanism is driven by the momentum of the flywheel 54.

In cases where a feed table is not employed, as illustrated, it is desirable to provide means for supporting a basket or other container from which the ears of corn are fed into the machine, and, according to the principles of the present invention, we provide a basket rack, indicated in its entirety by the reference numeral 90, which comprises a generally U-shaped strap member 91 having its intermediate portion 92 formed to receive a basket and end portions 94 and 95 formed with hook-like sections 96 and 97 that are adapted to be engaged over the laterally outwardly directed flanges 98 (Figure 1) of the adjacent vertical legs 2. An elongated bolt 100 passes through openings formed in the end portions 94 and 95 adjacent the bent-over sections 96 and 97, and when the bolt 100 is tightened the member 91 is securely clamped to the frame of the corn sheller. The member 91 is braced by a pair of braces 102 and 103, the outer end of each being pivoted, as at 104 and 105, to the member 91, and the lower and inner end of each of the members 102 and 103 is bent inwardly, as at 106 (Figure 1), along the line disposed diagonally with respect to the longitudinal axis of the brace member so as to engage the flange 98 of the associated frame member 2. The braces 102 and 103 are connected, like the end sections 94 and 95 of the member 91, by an elongated bolt 107. When the bolts 100 and 107 are loosened, the basket rack 90 may be raised or lowered along the flanges 98 to the desired position, or the rack may be entirely removed if desired, and by tightening the bolts 100 and 107, the basket rack 90 may be fastened to the frame 1 of the corn sheller in a rigid manner and be used to support a basket or box of corn ready to be shelled.

While we have shown and described above the principles of the present invention as embodied in a hand sheller, it will be apparent that our invention is not to be limited to the particular details shown and described above, but that, in fact, widely different means may be employed in the practice of the broader aspects of our invention.

What we claim, therefore, and desire to secure by Letters Patent is:

1. Ratchet mechanism for the hand crank of a hand corn sheller or the like having a driving shaft, comprising a hollow crank hub adapted to fit over said shaft and having sliding movement longitudinally thereon, a transverse pin removably carried by the latter within said hub, said hub having an opening therein to provide for inserting said pin in the shaft after the hub has been mounted thereon, a projection carried on the inside of said hub and having one portion serving as a shoulder adapted in one position of the hub to engage said pin to provide for driving said shaft in one direction by said crank, the other portion of said projection having an inclined surface acting to shift said hub in a direction to carry said shoulder away from said pin when said shaft turns in said one direction relative to said crank hub, thereby preventing the shaft from driving the crank hub in said one direction, and means removably carried by said crank hub in line with the opening therein to prevent said pin from falling out of the crank hub opening.

2. A corn sheller comprising a frame, a rigid cast metal head embracing the upper portion of said frame and comprising two mating sections, means rigidly fastening said sections together, shelling wheels mounted on axles spanning from one of said sections to the other, bearing means on each of said sections for supporting opposite ends of each of said shafts, respectively, a cob guard disposed within the rigid head and means supporting said cob guard solely on one of said sections of the head adjacent one of said shelling wheels and held by said rigid cast metal head against displacement relative thereto.

3. A corn sheller comprising a frame including generally vertically disposed frame members, panels fastened thereto, a rigid cast metal head comprising two mating sections, each having end flanges engaging over the upper ends of said frame members and one of said sections having a depending lug, means rigidly fastening said sections together, and shelling mechanism carried solely by said head and including a cob guard, and means fastening said cob guard to said depending lug and to said one head section at a point spaced from said depending lug.

4. A corn sheller comprising a frame, a rigid cast metal head comprising two mating sections, one of said sections having a depending lug, means rigidly fastening said sections together, shelling mechanism carried solely by said head and including a cob guard, means fastening said cob guard to said depending lug and to said one head section at a point spaced from said lug, and a cob discharge opening adjacent said cob guard, said opening being formed by registering notches in said rigid cast metal head sections and said cob guard including a portion disposed within said opening.

5. The combination of a frame having a pair of spaced apart vertical legs at each end, a rigid cast metal head mounted on said frame at the upper ends of said legs and extending substantially directly across the upper portion of the sheller from one pair of legs to the other, shelling mechanism supported by said rigid head and including a rotatable shaft adjacent one end of the sheller, a relatively large flywheel supported on said shaft outside said rigid head, a basket rack adapted to be attached to the legs of said frame adjacent said shaft and having portions extending outwardly generally alongside said flywheel, means for securing said basket rack member to the upper ends of said pair of legs adjacent said one end of the head, whereby the latter serves to transmit some of the stress imposed on said one pair of legs by said basket rack to the other pair of legs, and brace means connected with said one pair of legs and with said basket rack outwardly of said flywheel, said brace means including portions extending above said basket rack member so as to prevent the basket from inadvertently sliding along said rack into contact with said flywheel.

6. Ratchet mechanism for the hand crank of a hand corn sheller or the like having a driving shaft, comprising a hollow crank hub adapted to fit over said shaft and having sliding movement longitudinally thereon, a transverse pin removably carried by said shaft in a position within said hub, the latter having a projection within the same one portion of which serves as a shoulder to engage the pin in one position of the hub and providing for driving said shaft in one direction by said hand crank, the portion of said projection opposite said shoulder being of wedge-like formation and acting to shift said hub in a direction carrying the shoulder away from said pin when said shaft turns in said one direction relative to said crank hub, thereby preventing the shaft from driving the crank hub in said one direction, and means carried by said crank hub at the side of said pin opposite said projection and shoulder and engageable with said pin to limit the outward movement of said crank hub.

7. A corn sheller comprising a frame including generally vertically disposed frame members, panels fastened thereto, a rigid cast metal head comprising two mating sections supported on said frame above said panels, and means for fastening said sections rigidly together, a pair of shelling wheels, shafts for said wheels, a pair of aligned journals in opposite sections of said head, respectively, for rotatably supporting each of said shafts, a cob guard disposed in cooperative relation to said shelling wheels, means for rigidly supporting said cob guard solely on one of said head sections, and cleaning apparatus supported on said frame below said head and enclosed by said panels.

8. A corn sheller comprising a structural frame including generally vertically disposed members, sheet metal panels supported on said members and defining a housing, cleaning apparatus supported on said frame within said housing, a rigid cast metal head comprising a pair of oppositely disposed mating sections supported on said frame above said housing and defining an extension of said housing, a plurality of pairs of transversely aligned journals in opposite sections of said head, respectively, near the lower edge thereof, a plurality of shafts rotatably supported in said journals, shelling wheels mounted on said shafts and extending below said head into said sheet metal housing, a cob guard disposed in said housing in cooperative relation to said shelling wheels, and means for rigidly supporting said cob guard at a plurality of spaced points located solely on one section of said cast metal head.

9. In a corn sheller, a frame, a rigid sheller housing mounted on said frame, shelling mechanism carried in said housing and including a rotatable shaft extending out of the housing, a flywheel mounted on said shaft beside said housing, a basket rack adapted to be attached to said frame at one end thereof and adjacent said flywheel, and brace means connected to said frame and to said rack and having a portion extending above said rack at a point beyond said flywheel to prevent a basket on said rack from sliding into contact with said flywheel.

10. In a corn sheller, a frame comprising a pair of spaced vertical legs at each end, a rigid sheller housing mounted on said frame, shelling mechanism carried in said housing and including a rotatable shaft extending out of the housing, a flywheel mounted on said shaft beside said housing, a basket rack adapted to be attached to said frame at one end thereof and adjacent said flywheel, and at least one diagonal brace connected to one of said legs below the connection of the basket rack and extending upwardly and outwardly and connected to said rack outwardly of said flywheel, said brace having a portion extending above said rack to engage a basket thereon for preventing the latter from sliding into contact with said flywheel.

FREDERICK W. KIRBY.
FREDERICK A. THOMANN.